(12) United States Patent
Notter et al.

(10) Patent No.: US 10,934,977 B2
(45) Date of Patent: Mar. 2, 2021

(54) GAS/GAS MIXER FOR INTRODUCING GAS INTO THE EXHAUST GAS STREAM OF AN INTERNAL COMBUSTION ENGINE

(71) Applicant: Eberspächer Exhaust Technology GmbH & Co. KG, Neunkirchen (DE)

(72) Inventors: Manuel Notter, Schwaikheim (DE); Enver Kurpejovic, Kirchheim unter Teck (DE)

(73) Assignee: Eberspächer Exhaust Technology GmbH & Co. KG, Neunkirchen (DE)

( * ) Notice: Subject to any disclaimer, the term of this patent is extended or adjusted under 35 U.S.C. 154(b) by 0 days.

(21) Appl. No.: 16/380,165

(22) Filed: Apr. 10, 2019

(65) Prior Publication Data

US 2019/0316549 A1 Oct. 17, 2019

(30) Foreign Application Priority Data

Apr. 11, 2018 (DE) .................... 10 2018 108 592.3

(51) Int. Cl.
*F02M 26/19* (2016.01)
*B01F 5/04* (2006.01)
*F02M 26/00* (2016.01)

(52) U.S. Cl.
CPC ........... *F02M 26/19* (2016.02); *B01F 5/0456* (2013.01); *B01F 5/0463* (2013.01); *F02M 2026/001* (2016.02)

(58) Field of Classification Search
CPC ...... B01F 5/045; B01F 5/0456; B01F 5/0463; F01N 13/08; F01N 3/0293; F01N 3/05;
(Continued)

(56) References Cited

U.S. PATENT DOCUMENTS

| 6,887,435 B1 | 5/2005 | Albrecht et al. |
| 2005/0056313 A1* | 3/2005 | Hagen .................. B01F 5/0453 137/3 |

(Continued)

FOREIGN PATENT DOCUMENTS

| CN | 102287296 A | 12/2011 |
| CN | 204572130 U | 8/2015 |

(Continued)

OTHER PUBLICATIONS

JP 2014-111912 A. The reference, as previously cited in an Information Disclosure Statement filed with the U.S. Patent Office on Apr. 13, 2020 and considered by the Examiner on May 10, 2020, has been cited by the Japanese Patent Office in connection with the corresponding Japanese patent application No. 2019-074886.

(Continued)

*Primary Examiner* — Audrey K Bradley
*Assistant Examiner* — Dapinder Singh
(74) *Attorney, Agent, or Firm* — McGlew and Tuttle, P.C.

(57) ABSTRACT

A gas/gas mixer for introducing gas, especially air, into the exhaust gas stream of an internal combustion engine, includes a mixer body (32) that is elongated in the direction of a body longitudinal axis (L). A plurality of gas passage openings (38) are provided in a wall (36) of the mixer body (32) enclosing a volume of gas to be introduced (42) in the mixer body (32). The mixer body (32) is configured with a flattened cross-sectional profile, flattened obliquely to the body longitudinal axis (L).

17 Claims, 4 Drawing Sheets

(58) Field of Classification Search
CPC .......... F01N 3/101; F01N 3/2892; F01N 3/30; F01N 2240/20; F01N 2470/02; F02M 26/19; F02M 2026/001
USPC .......................... 60/286, 295, 299–301, 317
See application file for complete search history.

(56) References Cited

U.S. PATENT DOCUMENTS

| | | | | |
|---|---|---|---|---|
| 2011/0146236 | A1* | 6/2011 | Sun | F01N 13/009 60/274 |
| 2016/0177804 | A1* | 6/2016 | Matsumoto | F01N 9/00 60/277 |

FOREIGN PATENT DOCUMENTS

| | | |
|---|---|---|
| CN | 206092214 U | 4/2017 |
| DE | 102015104540 B3 | 2/2016 |
| EP | 2255867 A1 | 12/2010 |
| EP | 3299598 A1 | 3/2018 |
| JP | S51-089227 U | 7/1976 |
| JP | H02-095537 U | 7/1990 |
| JP | H05-141225 A | 6/1993 |
| JP | 2014-111912 A | 6/2014 |
| WO | 2007115810 A1 | 10/2007 |
| WO | 2015/065405 A1 | 5/2015 |
| WO | 2015065405 A1 | 5/2015 |
| WO | 2016117835 A1 | 7/2016 |

OTHER PUBLICATIONS

JP S53-007403 U. The reference, as previously cited in an Information Disclosure Statement filed with the U.S. Patent Office on Apr. 13, 2020 and considered by the Examiner on May 10, 2020, has been cited by the Japanese Patent Office in connection with the corresponding Japanese patent application No. 2019-074886.

JP H02-095537 U. The reference, as previously cited in an Information Disclosure Statement filed with the U.S. Patent Office on Apr. 13, 2020 and considered by the Examiner on May 10, 2020, has been cited by the Japanese Patent Office in connection with the corresponding Japanese patent application No. 2019-074886.

JP H 05-141225 A. The reference, as previously cited in an Information Disclosure Statement filed with the U.S. Patent Office on Apr. 13, 2020 and considered by the Examiner on May 10, 2020, has been cited by the Japanese Patent Office in connection with the corresponding Japanese patent application No. 2019-074886.

Translation of Chinese Search Report, published Nov. 3, 2020.

* cited by examiner

GAS/GAS MIXER FOR INTRODUCING GAS INTO THE EXHAUST GAS STREAM OF AN INTERNAL COMBUSTION ENGINE

CROSS REFERENCE TO RELATED APPLICATIONS

This application claims the benefit of priority under 35 U.S.C. § 119 of German Application 10 2018 108 592.3, filed Apr. 11, 2018, the entire contents of which are incorporated herein by reference.

TECHNICAL FIELD

The present invention pertains to a gas/gas mixer, with which gas can be introduced into the exhaust gas stream of an internal combustion engine.

BACKGROUND

To reduce the pollutant emission of internal combustion engines used in motor vehicles, it is known to provide particle filters in exhaust systems. In order to prevent a gradual clogging of such particle filters, the particles collecting in the particle filters are burned at a high temperature in a purification process.

SUMMARY

An object of the present invention is to provide a gas/gas mixer for introducing gas, especially air, into the exhaust gas stream of an internal combustion engine, which guarantees an efficient and uniform mixing of the gas to be introduced with the exhaust gas stream guided in an exhaust system.

This object is accomplished according to the present invention by a gas/gas mixer for introducing gas, especially air, into the exhaust gas stream of an internal combustion engine, comprising a mixer body that is elongated in the direction of a body longitudinal axis, wherein a volume of gas to be introduced is formed in the mixer body and a plurality of gas passage openings are provided in a wall of the mixer body, which wall encloses the volume of gas to be introduced. According to the present invention, the mixer body is configured with a flattened cross-sectional profile obliquely to the body longitudinal axis.

Because the mixer body is configured with a flattened, i.e., streamlined cross-sectional profile, it is achieved that a comparatively low flow resistance for the exhaust gas is introduced by the mixer body extending in the exhaust gas stream, on the one hand. On the other hand, the flow of exhaust gas around the mixer body ensures that the gas, i.e., for example, air, being released from the gas passage openings in the direction towards the exhaust gas stream, is carried along by the exhaust gas flowing around the mixer body and is mixed with this exhaust gas uniformly.

To provide the streamlined shape and to reduce the flow resistance introduced by the mixer body, a profile cross-sectional axis, representing the area of maximum width of the cross-sectional profile, is displaced (offset) in a direction of a profile longitudinal axis representing the length of the cross-sectional profile between a leading edge of the mixer body and a discharge edge of the mixer body in relation to a longitudinal center of the profile longitudinal axis in the direction towards the leading edge of the mixer body. The mixer body thus has approximately the shape of a drop in cross section.

The ratio of the distance between the profile cross-sectional axis and a longitudinal center of the profile longitudinal axis to the length of the profile longitudinal axis may advantageously be in the range of 0.02 to 0.05 in this case.

In order to be able to provide sufficient volume for feeding the gas to be introduced into the exhaust gas with as low as possible flow resistance in the interior of the mixer body, it is proposed that the ratio between a maximum width of the cross-sectional profile to a length of the cross-sectional profile between a leading edge of the mixer body and a discharge edge of the mixer body be in the range of 0.2 to 0.4.

A plurality of rows of gas passage openings extending essentially in the direction of the body longitudinal axis may be provided for an efficient introduction of the gas into the exhaust gas stream.

In case of an especially advantageous configuration of the gas/gas mixer, which also embodies an aspect of the present invention independent of the cross-sectional geometry of the mixer body, it is proposed that essentially no gas passage openings be provided in the wall of the mixer body in the area between a leading edge of the mixer body and an area of maximum width of the cross-sectional profile of the mixer body. It is possible in this manner to prevent the exhaust gas flowing onto the mixer body from being able to enter into the volume of gas to be introduced in the interior of the mixer body due to gas passage openings oriented in the upstream direction. At the same time, a vacuum, which takes in the gas led through the mixer body and thus supports the introduction of gas, is generated in the area of the gas passage openings arranged in the area of the mixer body located farther behind by the exhaust gas flowing around the mixer body on the outside.

The volume of gas to be introduced is preferably closed in the direction of the body longitudinal axis by a front wall, so that a defined release of gas can take place only in the area of the wall of the mixer body. Provisions may especially be made for this that no gas passage openings are provided in the front wall.

Especially in an exhaust system, in which a single particle filter follows a gas/gas mixer, provisions may be made for the mixer body to have an essentially symmetrical configuration in relation to a longitudinal central plane extending from a leading edge to a discharge edge for an as uniform as possible distribution of the gas introduced into the exhaust gas.

If a plurality of parallel-fed particle filters are provided downstream of such a gas/gas mixer, then it may be advantageous for a nonuniform admission of exhaust gas into same to be brought about in a defined manner, if the mixer body has an asymmetrical configuration in relation to a longitudinal central plane extending from a leading edge to a discharge edge.

This can be achieved, for example, by a number of gas passage openings on a first side of the wall of the mixer body in relation to the longitudinal central plane being different from a number of gas passage openings on a second side of the wall of the mixer body in relation to the longitudinal central plane. As an alternative or in addition, provisions may be made for a profile line of the wall of the mixer body on a first side in relation to the longitudinal central plane to be different from a profile line of the wall of the mixer body on a second side of the wall of the mixer body in relation to the longitudinal central plane. The mixer body may thus be configured with a cross-sectional profile coming close to an air foil or a wing.

The present invention further pertains to an exhaust system for an internal combustion engine, comprising at least one gas/gas mixer having the configuration according to the present invention at an exhaust gas pipe.

To introduce an as low as possible flow resistance with the mixer body extending in the exhaust gas stream, it is proposed that the at least one gas/gas mixer be arranged with the body longitudinal axis of the mixer body oriented essentially at right angles to an exhaust gas main direction of flow, and a leading edge of the mixer body is oriented essentially in the upstream direction in relation to the exhaust gas main direction of flow and a discharge edge of the mixer body is oriented essentially in the downstream direction in relation to the exhaust gas main direction of flow.

At least one particle filter may be provided downstream of the at least one gas/gas mixer.

In an alternative configuration of an exhaust system, a plurality of particle filters may be provided downstream of the at least one gas/gas mixer, wherein a pipe branch may be provided downstream of the exhaust gas pipe containing the at least one gas/gas mixer. A branching pipe may lead from the pipe branch to each particle filter in case of such a configuration.

Especially if an asymmetrical mode of operation, i.e., an asymmetrical admission of exhaust gas or gas introduced into this exhaust gas in case of a plurality of particle filters being provided shall be achieved, the longitudinal central plane of the mixer body may be positioned such that the pipe branch comprises at least one branching pipe each on both sides of the longitudinal central plane.

Furthermore, a catalytic converter device, preferably a three-way catalytic converter, may be arranged upstream of the at least one gas/gas mixer for reducing the emission of exhaust gas.

In order to support the burning of particles in a particle filter or in a plurality of particle filters, it is proposed that air be the gas to be introduced into the exhaust gas stream.

The present invention will be described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
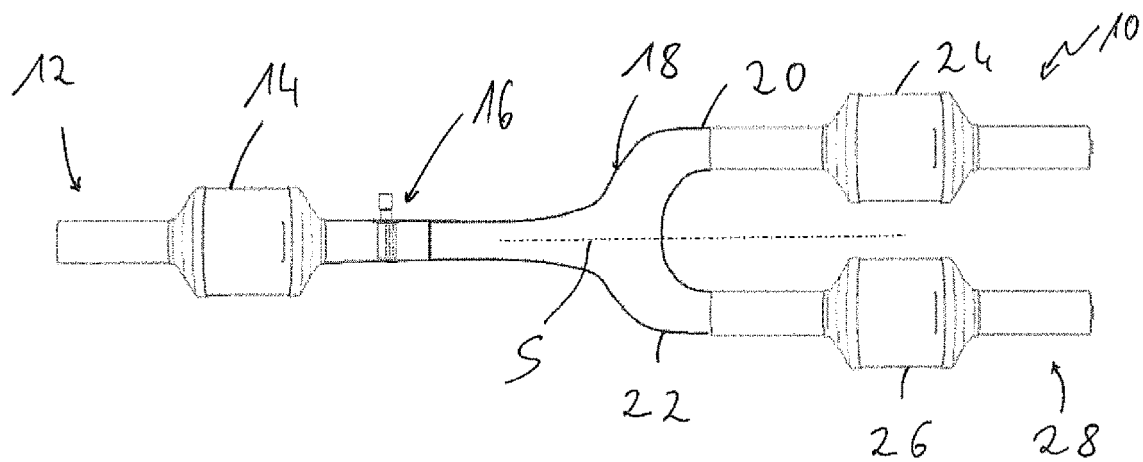
FIG. 1 is a schematic view of an exhaust system with two particle filters arranged downstream of a catalytic converter device and a gas/gas mixer arranged upstream in relation to the particle filters.

Referring to the drawings, FIG. 1 shows an exhaust system, generally designated by 10, of an internal combustion engine in a motor vehicle. A catalytic converter device 14, for example, a three-way catalytic converter, is arranged in an upstream area 12 of the exhaust system 10. A gas/gas mixer 16, which is explained in detail below and via which a gas, for example, air, can be mixed into the exhaust gas flowing in the exhaust system 10, is arranged downstream of the catalytic converter device 14. The exhaust system 10 comprises a pipe branch 18 in the direction of flow following the gas/gas mixer. Two branching pipes 20, 22 lead from the pipe branch 18 to respective particle filters 24, 26, which are fed with exhaust gas in this manner. The exhaust gas flowing through the particle filters 24, 26 can then be discharged to the environment in a downstream area 28 of the exhaust system 10, for example, after flowing through mufflers or other exhaust gas treatment units.

Figure 2:
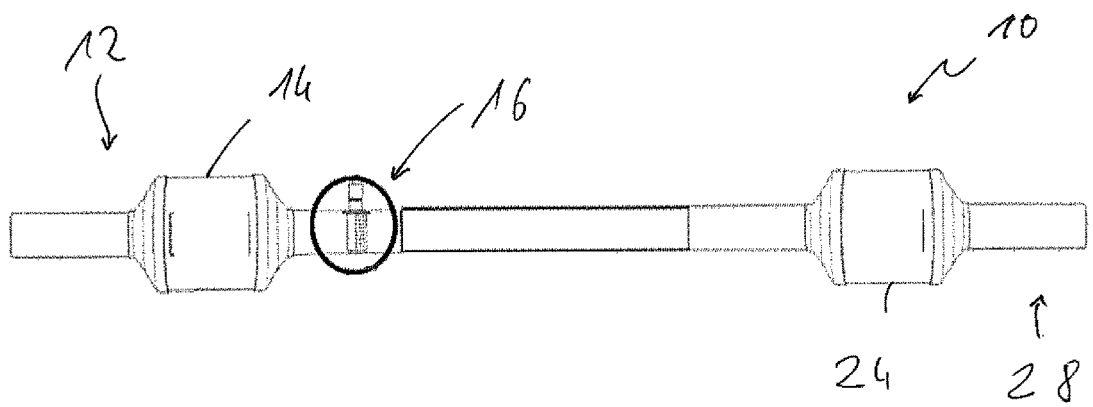
FIG. 2 is a schematic view corresponding to FIG. 1 of an exhaust system with a single particle filter.

FIG. 2 shows an alternative configuration of an exhaust system 10. In this type of configuration, only a single particle filter 24 is provided following the gas/gas mixer 16.

Figure 3:
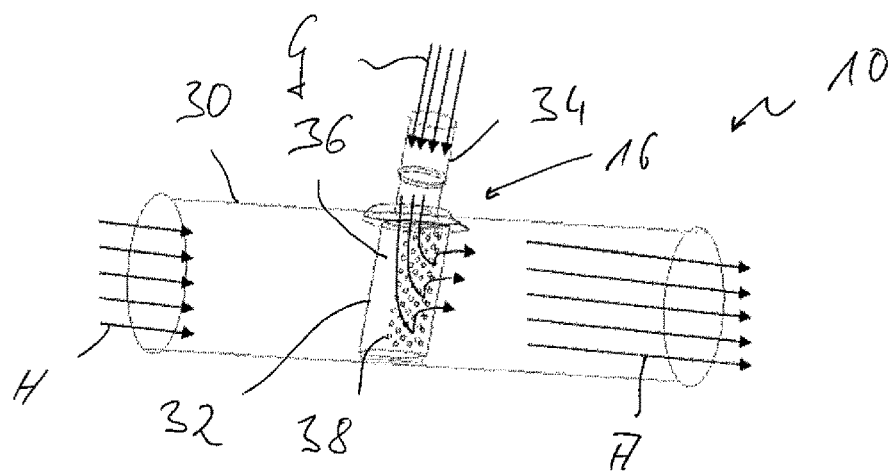
FIG. 3 is a schematic perspective view of a gas/gas mixer arranged in an exhaust gas pipe.
Figure 4:
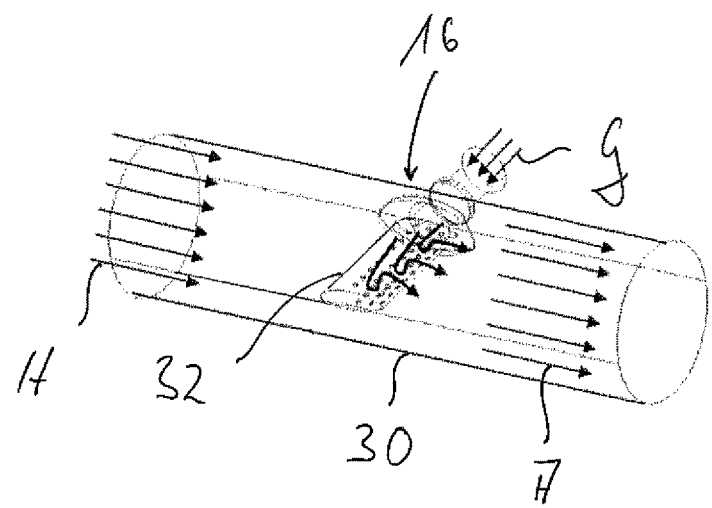
FIG. 4 is schematic perspective view showing, at a different angle, the gas/gas mixer in an exhaust gas pipe.
Figure 5:
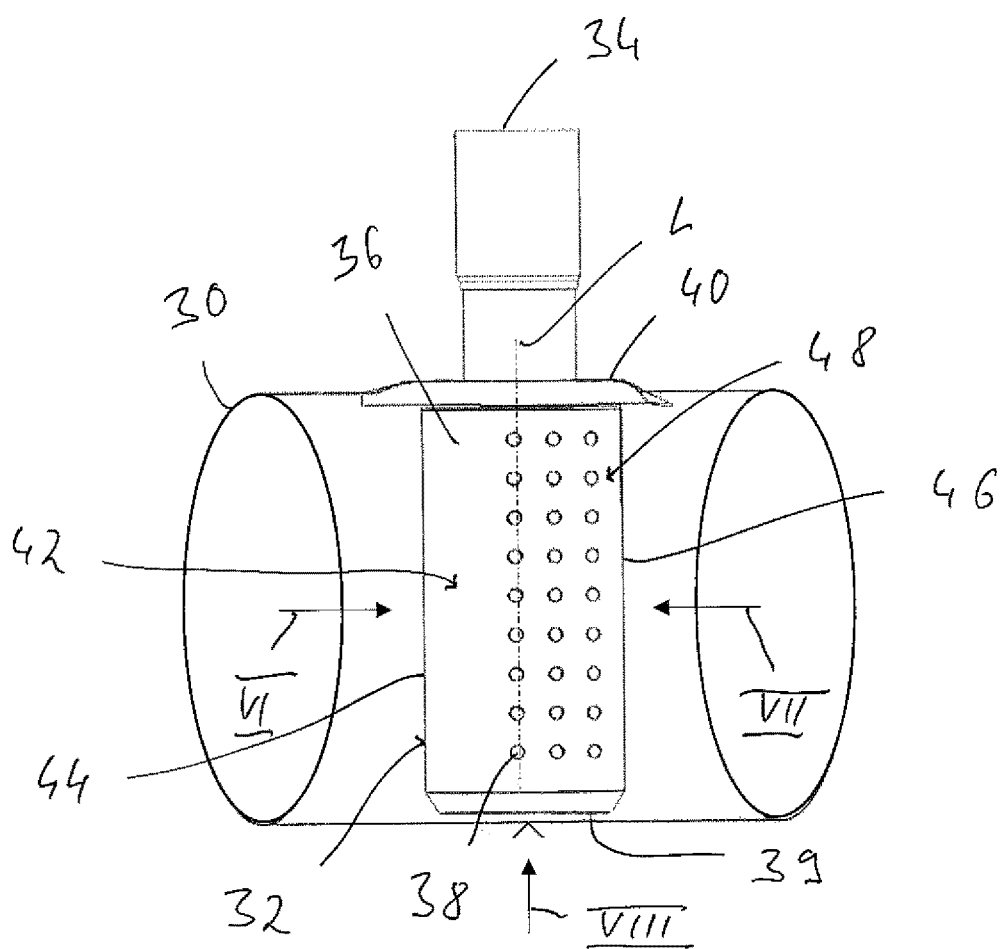
FIG. 5 is a lateral schematic view of a gas/gas mixer extending in an exhaust gas pipe.
Figure 6:
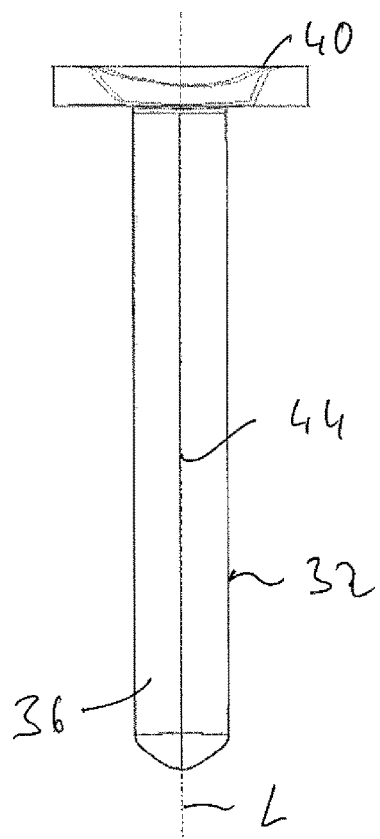
FIG. 6 is a side view of the gas/gas mixer shown in FIG. 5 in viewing direction VI in FIG. 5.
Figure 7:
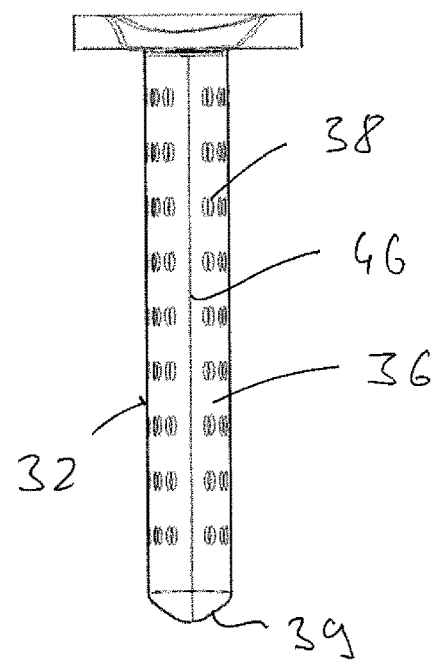
FIG. 7 is a view corresponding to FIG. 6 of the gas/gas mixer in viewing direction VII in FIG. 5.

FIGS. 3 and 4 illustrate the integration of the gas/gas mixer 16 into an exhaust gas pipe 30 of the exhaust system 10. The gas/gas mixer 16 comprises a mixer body 32, which is positioned in the exhaust gas pipe 30 such that the longitudinal axis L thereof extends essentially at right angles to an exhaust gas main direction of flow H in the exhaust gas pipe 30 in the area of the gas/gas mixer. A gas G, for example, air, is introduced into the mixer body 32 via a feed pipe 34 of the gas/gas mixer and is introduced into the gas stream via a plurality of gas passage openings 38 formed in a wall 36 of the mixer body and guided with same farther in the direction towards the particle filters 24 and 26 that are located downstream. The feed pipe 34 may be connected to a source for the gas G to be introduced or to a pipeline or the like carrying this gas.

The configuration of the gas/gas mixer 16 is described in detail below with reference to FIGS. 5 through 8.

The mixer body 32 of the gas/gas mixer 16 comprises the wall 36, which is configured with an essentially cylindrical structure and is thus configured with an essentially constant cross-sectional profile in the direction of the body longitudinal axis L of the mixer body 32. The mixer body 32 is carried, for example, on a support plate 40, which the feed pipe 34 also adjoins, at one end area located in the direction of the body longitudinal axis L. Via an associated opening in the exhaust gas pipe 30, the gas/gas mixer 16 can be positioned at the exhaust gas pipe 30 such that the mixer body 32 extends in the interior of the exhaust gas pipe 30 and exhaust gas A can flow around it there. The support plate 40 is located on the outside at the exhaust gas pipe 30 and can be connected permanently and in a gas-tight manner to same, for example, by welding. The dimension of the mixer body 32 can be coordinated with the exhaust gas pipe 30 such that the mixer body 32 extends essentially over the entire internal dimension of the exhaust gas pipe 30. At an end area facing away from the support plate 40, the mixer body 32 or a volume of gas to be introduced, which volume is formed therein, is closed in an essentially gas-tight manner by means of a front wall 39 in the direction of the body longitudinal axis L. The gas fed via the feed pipe 34 enters into the volume of gas to be introduced 42 of the mixer body 32 and leaves same via the gas passage openings 38 formed in the wall 36 of the mixer body 32.

The mixer body 32 has a flattened configuration for providing a streamlined cross-sectional profile, the cross section being in relation to the body longitudinal axis L of the mixer body. In this connection, a profile longitudinal axis PL extends between a leading edge 44 and a discharge edge 46 of the mixer body 32. When the gas/gas mixer 16 is integrated into the exhaust gas pipe 30, the mixer body 32 is preferably oriented such that the profile longitudinal axis PL is oriented essentially in the direction of the exhaust gas main direction of flow H. A longitudinal central plane E of the mixer body 32 is thus also oriented essentially in the exhaust gas main direction of flow H.

Figure 8:
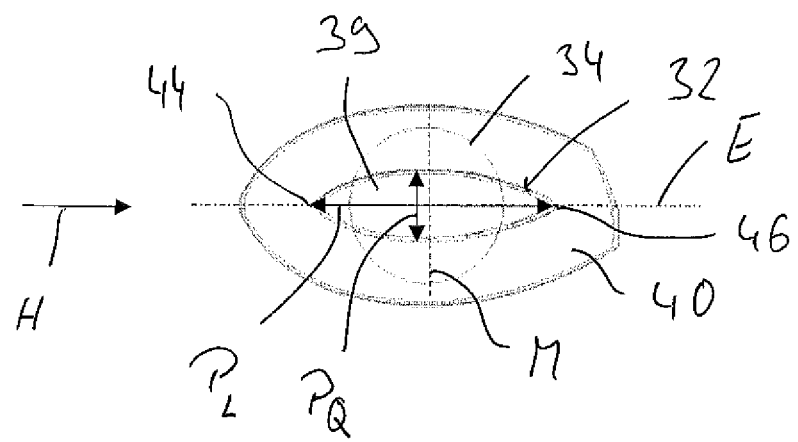
FIG. 8 is a view of the gas/gas mixer in viewing direction VIII in FIG. 5.

The profile cross-sectional axis PQ, which defines the area of maximum width of the mixer body 32, is oriented essentially obliquely to the exhaust gas main direction of flow H and to the longitudinal central plane E. It is seen in FIG. 8 that the profile cross-sectional axis PQ is displaced towards the leading edge 44 in the direction of the profile longitudinal axis PL for providing a cross-sectional profile coming close to the shape of a drop. The distance between a central line M of the profile longitudinal axis PL, which central line also contains the body longitudinal axis L or is cut by same, to the profile cross-sectional axis PQ, may be in the range of about 1 mm if, for example, the length of the profile longitudinal axis PL between the leading edge 44 and the discharge edge 46 is in the range of about 30 mm. The ratio of the distance between the central line M and the profile cross-sectional axis PQ of about 0.02 to 0.05 has generally proven to be advantageous. The dimension of the mixer body 32 in the direction of the profile cross-sectional axis PQ, i.e., the width of the profile body 32, may be in the range of about 9 mm in case of a length of about 30 mm. A range of 0.2 to 0.4 has proven to be especially advantageous here for the ratio of width to length of the mixer body 32, viewed in cross section, for an efficient introduction of the gas G with as low as possible flow resistance. It should be noted that the dimensions and ratios indicated above may each refer to the external dimension of the mixer body 32.

The gas passage openings 38 are arranged in the wall 36 of the mixer body 32 in a plurality of rows 48 extending essentially in the direction of the body longitudinal axis L. In this connection, FIG. 5 clearly shows that essentially no gas passage openings are arranged between the leading edge 44 and the area of maximum width of the mixer body 32. For example, the gas passage openings 38 of the row positioned farthest on the left-hand side in FIG. 5, i.e., farthest upstream, may be positioned such that their respective opening center is approximately in the area of the profile cross-sectional axis PQ, i.e., in the area of maximum width of the mixer body 32. The other rows 48 and the other gas passage openings 38 then follow in the wall 36 in the circumferential area thereof extending in the direction towards the discharge edge 46. With this arrangement, it is achieved that the exhaust gas A flowing from upstream in the direction of the mixer body 32 is deflected in the area of the leading edge 44 and is first deflected to the side by the wall 36 and then, beginning in the area of maximum width, also flows around areas of the circumferential wall 36, in which gas passage openings 38 are provided. The direct entry of exhaust gas into the volume of gas to be introduced 42 in the interior of the mixer body 32 is thus prevented. Due to the exhaust gas A then further flowing around the mixer body 32 and the wall 36 thereof in the direction towards the discharge edge 46, because of the vacuum building up or/and because of an overpressure of gas G to be introduced into the exhaust gas A, which overpressure is present, in principle, in the volume of gas to be introduced 42, this gas G is introduced through the gas passage openings 38 here into the exhaust gas stream and transported farther from same in the downstream direction. Because of the fact that a comparatively large number of gas passage openings 38 may be provided very uniformly distributed in the wall 36 also due to the comparatively long extension of the mixer body 32 in the direction of the exhaust gas main direction of flow, a uniform mixing of the exhaust gas A with the gas to be introduced into same is guaranteed. This ensures that one or more particle filters following downstream are also supplied uniformly with the gas, for example, air. For this purpose, it is further advantageous when, as shown in the embodiment of FIGS. 3 through 8, the mixer body 32 has an essentially symmetrical configuration in relation to the longitudinal central plane E, which means that both the wall 36 has a symmetrical, especially mirror-symmetrical, configuration in relation to this longitudinal central plane E, and a symmetrical arrangement of the gas passage openings 38 on both sides of the wall 36 in relation to the longitudinal central plane E is provided. In case of an exhaust system with, for example, two particle filters 24, 26 fed parallel, as this is shown in FIG. 1, a uniform feed of the gas G introduced via the gas/gas mixer 16 to the two particle filters 24, 26 can be supported by the mixer body 32 being positioned in the exhaust gas pipe 30 such that the body longitudinal axis L thereof is essentially at right angles to a central plane or plane of symmetry S of the pipe branch 18, as this is shown in FIG. 1.

Figure 9:
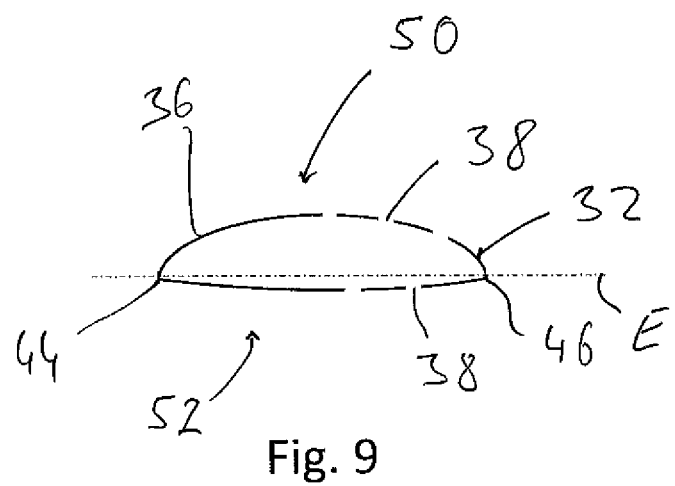
FIG. 9 is a schematic view corresponding to FIG. 8 of an alternative type of configuration of a gas/gas mixer.

If a nonuniform feeding of the two particle filters 24, 26 with exhaust gas A or gas G transported in the exhaust gas stream shall be achieved in a defined manner, it is advantageous to mount the mixer body 32 at the exhaust gas pipe 30 such that the longitudinal central plane E thereof corresponds to the plane of symmetry S of the pipe branch 18, i.e., the gas/gas mixer 16 is positioned rotated by about 90° in relation to the positioning shown in FIG. 1. In this case, as schematically shown in FIG. 9, the mixer body 32 may, moreover, be configured such that the two sides 50, 52 of the profile body 32 or of the wall 36 of same are configured with different profile lines in relation to the longitudinal central plane E, which extends between the leading edge 44 and the discharge edge 46. For example, in FIG. 9 the wall 36 is configured with a markedly stronger curvature on the side 50 than on the side 52. In this manner, an asymmetrical flow around the mixer body 32 and correspondingly also a nonuniform introduction or distribution of the gas G in the area downstream of the mixer body 32 is achieved. As an alternative and in a manner supporting this, provisions may be made for the gas passage openings 38 provided there to be provided with a different number or/and different size or/and different positioning on both sides 50, 52 of the mixer body 32. It can be guaranteed in this manner that different quantities of the gas G are introduced into the exhaust gas stream on both sides 50, 52 of the mixer body 32. In case of splitting the exhaust gas stream in the area of the pipe branch 18 then following downstream, partial streams of the exhaust gas A, through which gas G passes through to a varying extent, are then generated and accordingly different gas concentrations in the exhaust gas A are also led to the particle filters 24, 26.

Finally, it should be noted that, without departing from the principles of the present invention, various variations may be made in the gas/gas mixer and the exhaust systems containing same, which are shown in the figures and described in relation to the figures. Thus, for example, the gas passage openings 38 provided in the wall 36 of the mixer body 32 may have different sizes or/and be provided in the wall 36 with different surface density, i.e., with different distribution. The mixer body 32 itself may also be configured with a different cross-sectional profile. For example, the streamlined shape could also be achieved if the profile cross-sectional axis PQ were positioned in the area of the longitudinal center of the profile longitudinal axis PL, i.e., in the area of the center line M in FIG. 8. The gas/gas mixer is preferably made of metallic material, for example, sheet metal material for an exhaust gas-resistant configuration.

Further, the mixer body 32 could, in principle, also be configured with a circular cross-sectional profile. In order to also achieve especially the above-described advantages in terms of the introduction of gas into the exhaust gas stream here, provisions may also be provided there for essentially no gas passage openings to be provided in an area between a leading edge, i.e., the circumferential area of such a wall 36 configured with a circular cross section, which circumferential area is positioned farthest upstream, and the area of maximum width, while the gas passage openings 38 may then be provided, for example, in a row-type arrangement in the wall 36 following or starting from the area of maximum width in the direction towards the discharge edge, i.e., the circumferential area of the wall 36, which is positioned farthest downstream.

While specific embodiments of the invention have been shown and described in detail to illustrate the application of the principles of the invention, it will be understood that the invention may be embodied otherwise without departing from such principles.

What is claimed is:

1. A gas/gas mixer for introducing gas into an exhaust gas stream of an internal combustion engine, the gas/gas mixer comprising a mixer body that is elongated in a direction of a body longitudinal axis, the mixer body comprising a wall wherein a volume of gas to be introduced is formed in the mixer body and a plurality of gas passage openings are provided in the wall of the mixer body, which wall encloses the volume of gas to be introduced, wherein the mixer body is configured with a flattened cross-sectional profile, flattened obliquely to the body longitudinal axis, wherein a profile cross-sectional axis, representing an area of maximum width of the cross-sectional profile, is offset a distance in a direction of a profile longitudinal axis, representing a length of the cross-sectional profile between a leading edge of the mixer body and a discharge edge of the mixer body, in relation to a longitudinal center of the profile longitudinal axis in a direction towards the leading edge of the mixer body, wherein a ratio of the distance between the profile cross-sectional axis and a longitudinal center of the profile longitudinal axis to a length of the profile longitudinal axis is in a range of 0.02 to 0.05.

2. The gas/gas mixer in accordance with claim 1, wherein a ratio between a maximum width of the cross-sectional profile to a length of the cross-sectional profile between a leading edge of the mixer body and a discharge edge of the mixer body is in the range of 0.2 to 0.4.

3. The gas/gas mixer in accordance with claim 1, wherein the mixer body has a plurality of rows of gas passage openings are provided extending essentially in the direction of the body longitudinal axis.

4. The gas/gas mixer in accordance with claim 3, wherein essentially no gas passage openings are provided in the wall of the mixer body in an area between a leading edge of the mixer body and an area of maximum width of the cross-sectional profile of the mixer body.

5. The gas/gas mixer in accordance with claim 1, wherein the volume of gas to be introduced is closed by means of a front wall in the direction of the body longitudinal axis.

6. The gas/gas mixer in accordance with claim 5, wherein:
   the mixer body has a plurality of gas passage openings; and
   no gas passage openings are provided in the front wall.

7. The gas/gas mixer in accordance with claim 1, wherein the mixer body has an essentially symmetrical configuration in relation to a longitudinal central plane extending from a leading edge to a discharge edge.

8. The gas/gas mixer in accordance with claim 1, wherein the mixer body has an asymmetrical configuration in relation to a longitudinal central plane extending from a leading edge to a discharge edge.

9. The gas/gas mixer in accordance with claim 8, wherein:
   the mixer body has a plurality of gas passage openings; and
   a number of gas passage openings on a first side of the wall of the mixer body in relation to the longitudinal central plane is different from a number of gas passage openings on a second side of the wall of the mixer body in relation to the longitudinal central plane.

10. The gas/gas mixer in accordance with claim 8, wherein a profile line of the wall of the mixer body on a first side in relation to the longitudinal central plane is different from a profile line of the wall of the mixer body on a second side of the wall of the mixer body in relation to the longitudinal central plane.

11. An exhaust system for an internal combustion engine, the exhaust system comprising:
   an exhaust pipe;
   at least one gas/gas mixer at the exhaust gas pipe for introducing gas into an exhaust gas stream flowing in the exhaust pipe, the gas/gas mixer comprising a mixer body that is elongated in a direction of a body longitudinal axis, the mixer body comprising a wall wherein a volume of the gas to be introduced into the exhaust gas stream is formed in the mixer body and a plurality of gas passage openings are provided in the wall of the mixer body, which wall encloses the volume of the gas to be introduced, wherein the mixer body is configured with a flattened cross-sectional profile, flattened obliquely to the body longitudinal axis;
   a first particle filter downstream of the at least one gas/gas mixer and a second particle filter downstream of the at least one gas/gas mixer;
   a pipe branch provided downstream of the exhaust gas pipe containing the at least one gas/gas mixer, a first branching pipe connected to the pipe branch and leading from the pipe branch to the first particle filter and a second branching pipe connected to the pipe branch and leading from the pipe branch to the second particle filter.

12. The exhaust system in accordance with claim 11, wherein:
   the at least one gas/gas mixer is arranged with the body longitudinal axis of the mixer body oriented essentially at right angles to an exhaust gas main direction of flow;
   a leading edge of the mixer body is oriented essentially in an upstream direction in relation to the exhaust gas main direction of flow and a discharge edge of the mixer body is oriented essentially in a downstream direction in relation to the exhaust gas main direction of flow.

13. The exhaust system in accordance with claim 11, wherein:
the mixer body has an asymmetrical configuration in relation to a longitudinal central plane extending from a leading edge to a discharge edge;
the longitudinal central plane of the mixer body is positioned such that the pipe branch comprises at least one branching pipe each on both sides of the longitudinal central plane.

14. The exhaust system in accordance with claim 11, further comprising a catalytic converter device arranged upstream of the at least one gas/gas mixer.

15. The exhaust system in accordance with claim 11, wherein the gas to be introduced into the exhaust gas is air.

16. The exhaust system in accordance with claim 11, wherein a ratio between a maximum width of the cross-sectional profile to a length of the cross-sectional profile, between a leading edge of the mixer body and a discharge edge of the mixer body is in the range of 0.2 to 0.4.

17. An exhaust system comprising:
an exhaust pipe configured to flow exhaust gas in an exhaust flow;
a mixer body arranged in said exhaust pipe, said mixer body having a longitudinal axis, and being elongated along said longitudinal axis, said longitudinal axis extending perpendicular to the exhaust flow through said exhaust pipe, said mixer body defining an interior space configured to receive a gas, said gas mixer including a wall defining a plurality of openings, said plurality of openings providing communication between said interior space of said gas mixer and a space both exterior of said gas mixer and interior of said exhaust pipe, said mixer body having a leading edge and a discharge edge with respect to the exhaust flow, said mixer body having a distance between said leading edge and said discharge edge, said mixing body having a maximum width axis extending perpendicular to a direction of said longitudinal axis and the exhaust flow, said maximum width axis being arranged at a maximum width of said mixing body along said direction of said maximum width axis, said distance having a center, said mixer body being shaped to have said maximum width axis spaced from said center by an offset in a direction of said leading edge, said mixer body being shaped to have a ratio of said offset to said distance be in a range of 0.02 to 0.05.

* * * * *